(12) United States Patent
Himeno et al.

(10) Patent No.: US 11,203,408 B2
(45) Date of Patent: Dec. 21, 2021

(54) CONTROL SURFACE OF FLYING OBJECT, AND FLYING OBJECT

(71) Applicant: MITSUBISHI HEAVY INDUSTRIES, LTD., Tokyo (JP)

(72) Inventors: Takamitsu Himeno, Tokyo (JP); Hiroaki Kyuno, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 257 days.

(21) Appl. No.: 16/113,255

(22) Filed: Aug. 27, 2018

(65) Prior Publication Data
US 2019/0063888 A1 Feb. 28, 2019

(30) Foreign Application Priority Data

Aug. 29, 2017 (JP) .............................. JP2017-164379

(51) Int. Cl.
- *F42B 10/64* (2006.01)
- *B64C 3/20* (2006.01)
- *B33Y 80/00* (2015.01)
- *F42B 10/14* (2006.01)

(52) U.S. Cl.
CPC ................ *B64C 3/20* (2013.01); *B33Y 80/00* (2014.12); *F42B 10/143* (2013.01); *F42B 10/64* (2013.01)

(58) Field of Classification Search
CPC .... B64C 3/20; B64C 1/08; B64C 9/00; B64C 5/06; B64C 5/22; B64C 3/00; F42B 10/143; F42B 10/64; F42B 10/06; F42B 10/14; B33Y 80/00
See application file for complete search history.

(56) References Cited

U.S. PATENT DOCUMENTS

| 1,827,181 A | * | 10/1931 | Alfaro ....................... B64C 3/00 244/117 R |
| 2,115,504 A | * | 4/1938 | Wallis ....................... B64C 3/00 244/123.4 |
| 2,386,915 A | * | 10/1945 | Spittler ................... B64C 13/00 244/88 |
| 5,293,811 A | * | 3/1994 | DeLair .................... F42B 10/64 92/49 |

(Continued)

FOREIGN PATENT DOCUMENTS

| CA | 2 444 560 | 4/2004 |
| CA | 2 444 869 | 4/2004 |

(Continued)

*Primary Examiner* — Medhat Badawi
*Assistant Examiner* — Vicente Rodriguez
(74) *Attorney, Agent, or Firm* — Wenderoth, Lind & Ponack, L.L.P.

(57) ABSTRACT

The control surface according to the present invention controls an attitude of a flying object, and includes a skin covering an internal space and a lattice structure supporting the skin in the internal space. The lattice structure has mechanical strength that is changeable in one or both of a surface length direction and a surface width direction. For example, the mechanical strength at a root of the control surface in the surface length direction may be made larger than the mechanical strength of other regions in the surface length direction, or the mechanical strength at a front edge and a rear edge in the surface width direction may be made larger than the mechanical strength of other regions in the surface width direction.

15 Claims, 7 Drawing Sheets

(56) References Cited

U.S. PATENT DOCUMENTS

| | | | | |
|---|---|---|---|---|
| 8,302,903 | B2* | 11/2012 | Morgan | B64C 9/12 |
| | | | | 244/90 R |
| 9,919,791 | B2* | 3/2018 | Autry | B32B 37/1018 |
| 10,358,821 | B2* | 7/2019 | Cawthorne | B64C 1/068 |
| 2004/0140394 | A1* | 7/2004 | Bath | B64C 5/16 |
| | | | | 244/45 A |
| 2006/0273057 | A1 | 12/2006 | Zollondz et al. | |
| 2010/0171241 | A1* | 7/2010 | Huskamp | B33Y 10/00 |
| | | | | 264/497 |
| 2010/0236759 | A1* | 9/2010 | Wadley | E04C 2/365 |
| | | | | 165/104.19 |
| 2013/0276461 | A1* | 10/2013 | Propheter-Hinckley | |
| | | | | F04D 29/325 |
| | | | | 60/806 |
| 2014/0302261 | A1* | 10/2014 | Cheung | B64C 3/48 |
| | | | | 428/33 |

FOREIGN PATENT DOCUMENTS

| | | |
|---|---|---|
| JP | 10-253300 | 9/1998 |
| JP | 11-14299 | 1/1999 |
| JP | 2004-142737 | 5/2004 |
| JP | 5096692 | 9/2012 |
| JP | 2015-127121 | 7/2015 |

\* cited by examiner

FIG. 3A
FIG. 3B
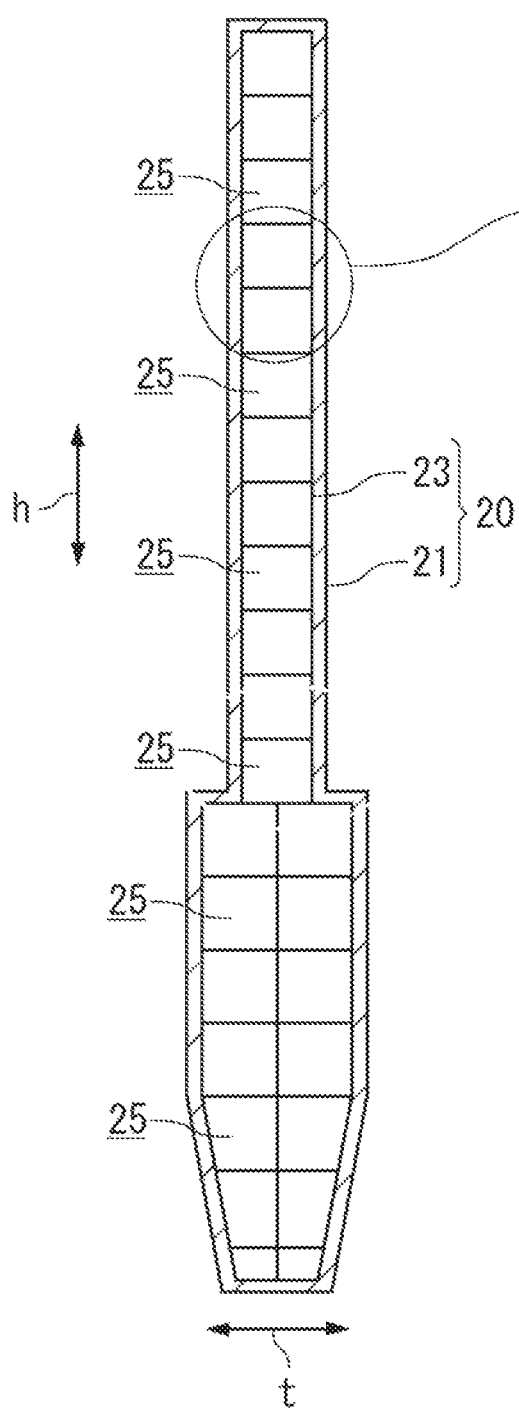
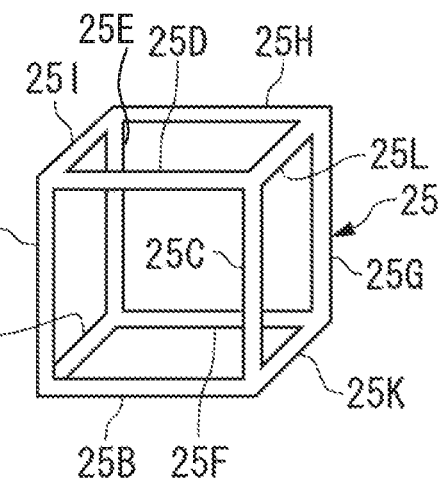

FIG. 6A
FIG. 6B
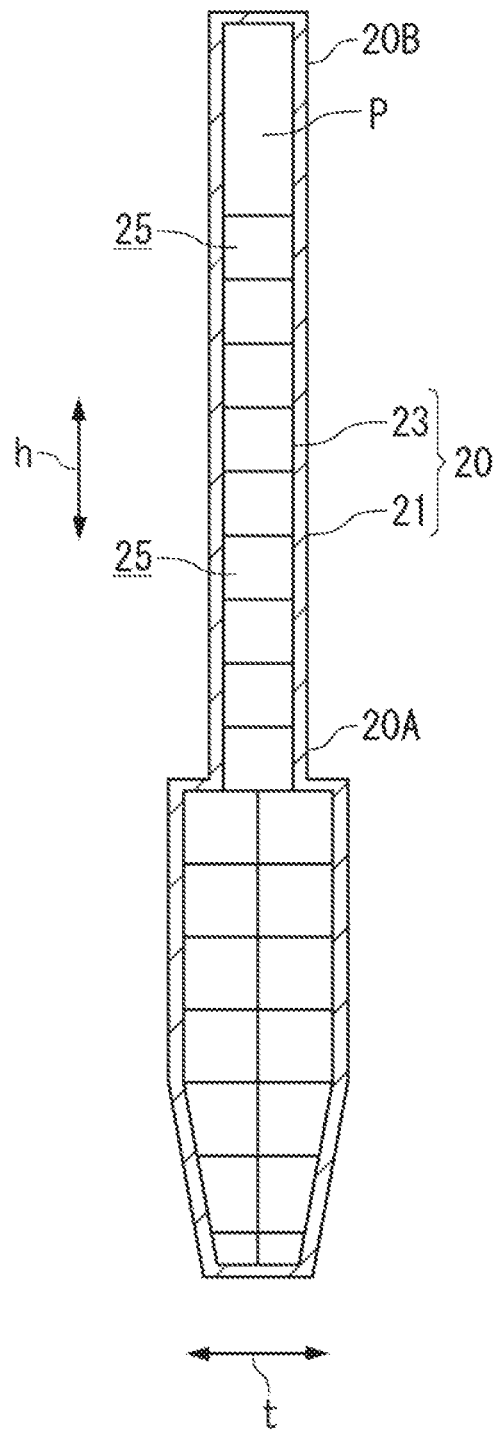
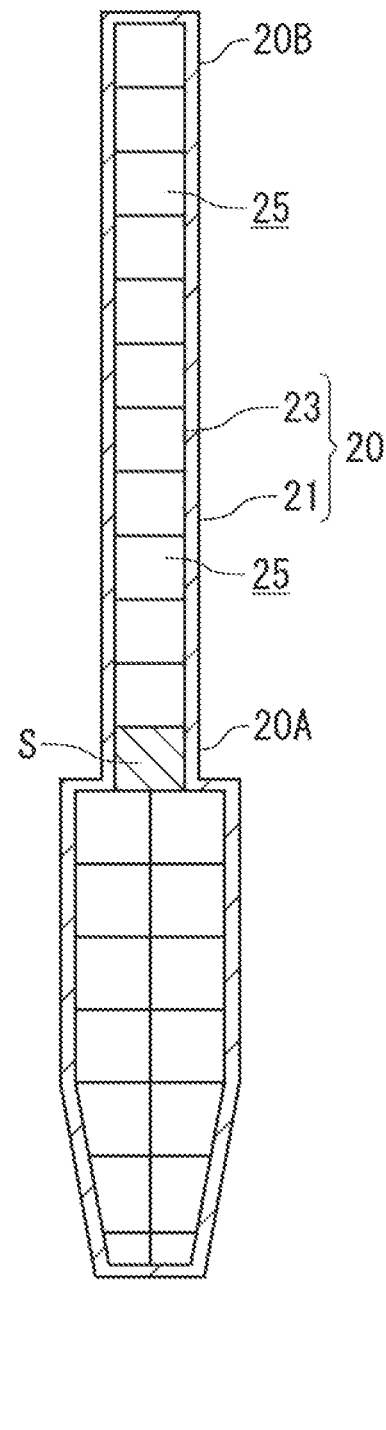

CONTROL SURFACE OF FLYING OBJECT, AND FLYING OBJECT

BACKGROUND OF THE INVENTION

Field of the Invention

The present invention relates to a structure of a control surface of a flying object.

Description of the Related Art

A flying object is an object that flies and moves in the air, and in particular, is defined as a man-made object that flies at high altitude. For example, as disclosed in JP H10-253300 A, a flying object is equipped with a control surface. The control surface controls, with use of a control signal, an attitude angle of the flying object during flight, to guide the flying object to a target. The control signal may be generated on the ground and transmitted to the flying object, or may be generated based on a detection signal detected inside the flying object.

The existing control surface is fabricated from a forged block by cutting. Further, the control surface is required to exert both bending rigidity and torsional rigidity. In FIGS. 2A-2C, bending moment M occurs in a thickness direction t of the control surface 20, and torsion moment T occurs around a control shaft 28 of the control surface 20.

The cut control surface is solid. Therefore, the weight of the control surface is inevitably increased, which largely influences flight performance of the flying object. In addition, the cutting is originally high in cost of materials and processing.

A common wing that is not controlled includes ribs on an inner surface of the wing for securement of rigidity (e.g., JP 2004-142737 A). A rib structure of the common wing, however, is designed mainly in terms of bending rigidity in fact.

Accordingly, an object of the present invention is to provide a control surface that is lighter in weight than a solid control surface formed by cutting, and makes it possible to prevent a surface from being dented by working fluid force.

SUMMARY OF THE INVENTION

According to the present invention, a control surface controls an attitude of a flying object, and includes a skin covering an internal space, and a lattice structure that is provided in the internal space and supports the skin.

The lattice structure according to the present invention has mechanical strength that is changeable in one or both of a surface length direction h and a surface width direction w.

At this time, in the lattice structure according to the present invention, the mechanical strength at a root part in the surface length direction h is preferably made larger than mechanical strength of other regions in the surface length direction h.

Further, in the lattice structure according to the present invention, the mechanical strength at a front edge and a rear edge in the surface width direction w is preferably made larger than mechanical strength of other regions in the surface width direction w.

In the lattice structure according to the present invention, to change the mechanical strength in one or both of the surface length direction h and the surface width direction w, it is sufficient to vary one or both of a lattice diameter and a pitch of each of a plurality of unit lattices that configure the lattice structure.

The lattice structure according to the present invention may partially include a hollow part, or may partially include a solid part.

The present invention provides a flying object that includes a main body of the flying object and a control surface to be mounted on the main body, and as the control surface, the above-described control surface is adoptable.

The control surface according to the present invention includes the skin and the lattice structure supporting the skin. Therefore, it is possible to secure bending rigidity and torsional rigidity while reducing the weight as compared with the solid control surface, and to prevent the skin from being dented.

BRIEF DESCRIPTION OF THE DRAWINGS

FIGS. 3A and 3B each illustrate the control surface of the flying object according to the embodiment of the present invention, FIG. 3A being a front cross-sectional view, and FIG. 3B being a partial enlarged perspective view of FIG. 3A;

FIGS. 6A and 6B are front cross-sectional views of control surface of a flying object according to still another embodiment of the present invention.

DETAILED DESCRIPTION OF THE PREFERRED EMBODIMENTS

An embodiment of the present invention is described below with reference to accompanying drawings.

A flying object 1 according to the present embodiment illustrated in FIGS. 1A, 1B and FIGS. 2A to 2C includes a main body 10 and a control surface 20 that is provided at a rear end part of the main body 10. The control surface 20 controls an attitude of the flying object 1. Although illustration is omitted, an engine that provides propulsion force to the flying object 1 and an actuator that rotates a control shaft 28 of the control surface 20 around a shaft center are provided inside the main body 10.

Figure 1A:
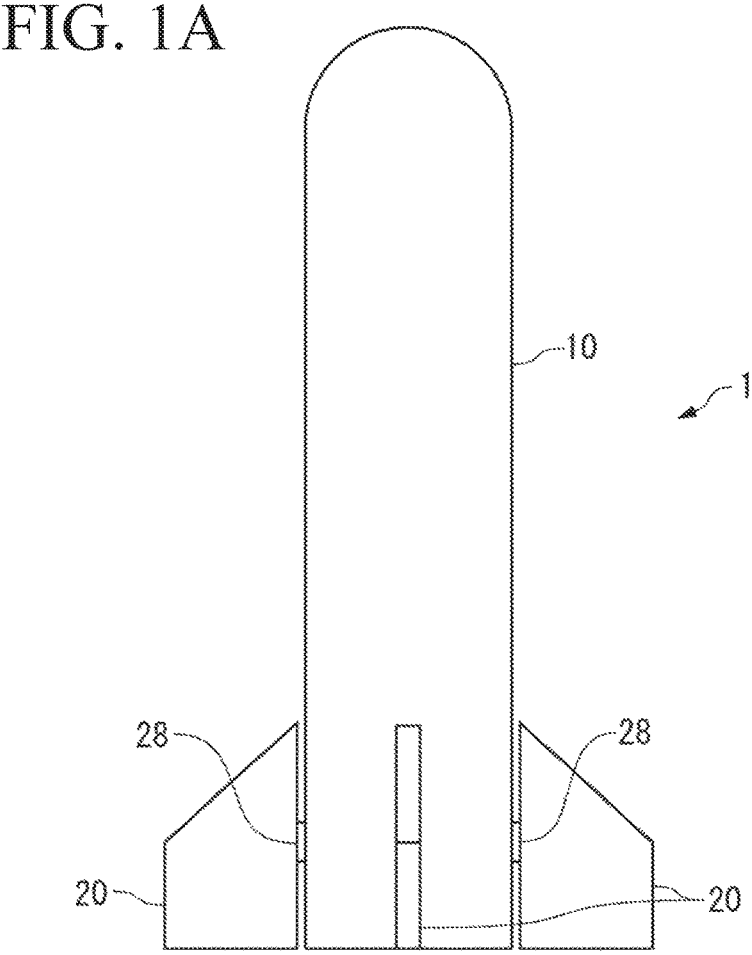
FIGS. 1A and 1B each illustrate a flying object according to an embodiment of the present invention, FIG. 1A being a side view, and FIG. 1B being a front view.
Figure 1B:
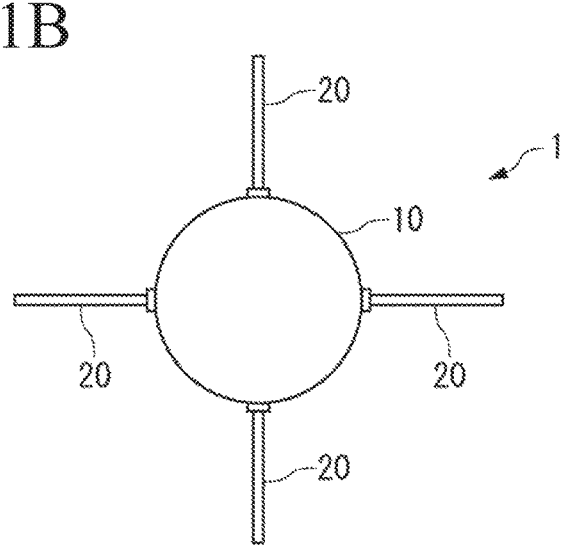
Figure 2A:
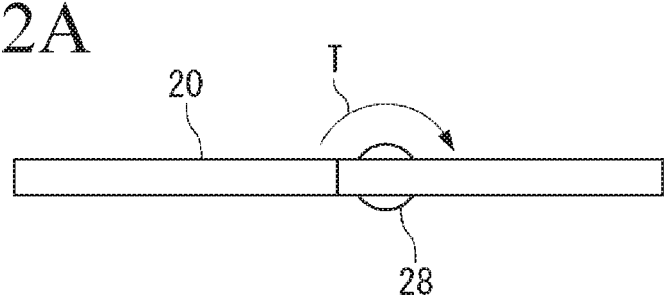
FIGS. 2A to 2C each illustrate a control surface of the flying object according to the embodiment of the present invention, FIG. 2A being a plan view, FIG. 2B being a side view, and FIG. 2C being a front view.
Figure 2B:
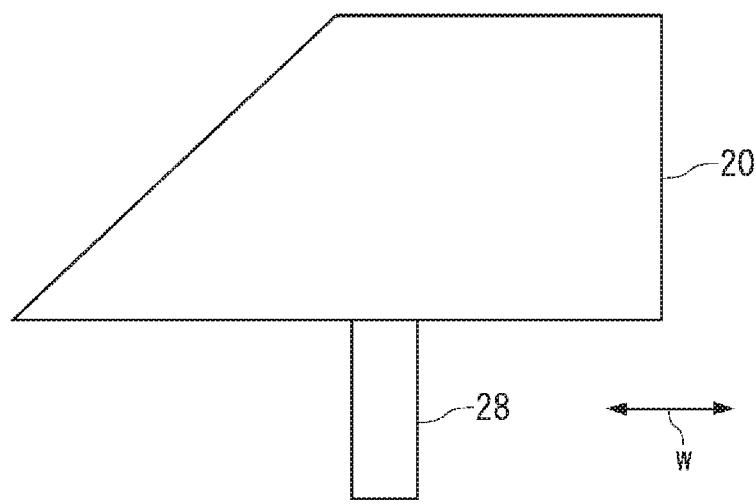
Figure 2C:
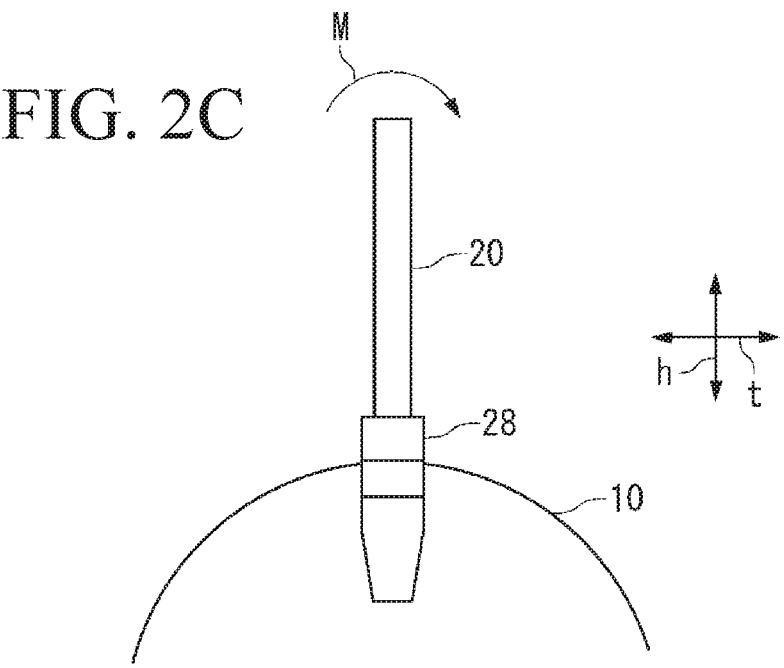

As illustrated in FIGS. 2A to 2C, bending moment M and torsion moment T occur on the control surface 20 during flight of the flying object 1. The control surface 20 according to the present embodiment includes a lattice structure as illustrated in FIGS. 3A and 3B in order to exert both of bending rigidity and torsional rigidity and to achieve reduction in weight. The lattice structure used herein indicates a structure in which three-dimensional lattices are continuously repeated.

As illustrated in FIGS. 3A and 3B, the control surface 20 includes a skin 21 and a lattice structure 23 provided inside the skin 21.

The skin 21 forms an outer cover covering an internal space of the control surface 20 and is formed integrally with the lattice structure 23. The skin 21 contains a ferrous metal material or a nonferrous metal material. Examples of the ferrous metal material include structural steel and stainless steel, and examples of nonferrous metal material include a titanium alloy and an aluminum alloy. This is true of the lattice structure 23.

The lattice structure 23 is configured of a plurality of unit lattices 25 that are stacked over an entire region inside the control surface 20 surrounded by the skin 21. In other words, the unit lattices 25 are components of the lattice structure 23.

As illustrated in FIG. 3B, each of the unit lattices 25 according to the present embodiment includes a rectangular parallelepiped lattice, and includes lattice elements 25A to 25L respectively corresponding to sides configuring the lattice. Each of the lattice elements 25A to 25L includes an optional cross-sectional shape, for example, a polygonal shape such as a triangle and rectangular shape, or a circular shape.

The lattice elements adjacent to each other in the lattice structure 23 may share the lattice elements 25A to 25L.

The structure of each of the unit lattices 25 is illustrative, and the present invention may adopt a unit lattice including other structure, for example, any of unit lattices illustrated in FIGS. 7A to 7D.

The control surface 20 including the skin 21 and the lattice structure 23 is manufactured by laser sintering.

The laser sintering is also referred to as selective laser sintering (SLS), and the control surface 20 is manufactured by a 3D (three-dimensional) printer using metal powder.

In the laser sintering (SLS), a laser beam is applied to the metal powder while the metal powder is built up according to design data, to sinter the metal powder. As a result, it is possible to obtain relative density close to 100% after sintering, which exerts original characteristics of the metal material. The laser sintering uses a carbon dioxide gas laser.

The manufacturing method of the control surface 20 is not limited to the laser sintering. For example, the lattice structure 23 is obtainable by 3D print techniques such as direct metal laser sintering (DMLS), selective laser melting (SLM), electron beam melting (EBM), laser engineered net shaping (LENS), and liquid metal jet printing (LMJP).

Dimensions of each of the unit lattices 25 are appropriately set according to the required bending rigidity and the required torsional rigidity, and according to the structure of each of the unit lattices 25. For example, in the case of the unit lattices 25 illustrated in FIGS. 3A, 3B, a dimension (lattice diameter) of a cross-section by the lattice elements 25A to 25L may be 0.5 mm to 5 mm, and a length (pitch) of each of the lattice elements 25A to 25L may be 1 mm to 20 mm. Note that the dimension of the cross-section indicates a length of one side in the case of a polygonal shape, and indicates a diameter in the case of a circular shape.

The bending moment M and the torsion moment T occur on the control surface 20 during flight. The control surface 20, however, includes the lattice structure 23. Therefore, the control surface 20 can exert rigidity withstanding the bending moment M and the torsion moment T while being reduced in weight, as compared with a solid control surface.

Further, in the control surface 20, the skin 21 receives wind pressure during flight of the flying object 1. If the control surface 20 includes only the skin 21, the control surface 20 may be dented by the wind pressure. Although increasing a thickness of the skin 21 can suppress the denting, this runs counter to reduction of the weight of the control surface 20. In contrast, since the lattice structure 23 of the control surface 20 supports the skin 21 from the inside of the control surface 20, it is possible to prevent the skin 21 from being dented by the wind pressure. In addition, supporting the skin 21 makes it possible to prevent the skin 21 from being dented while suppressing increase of the weight, as compared with increase of the thickness of the skin 21.

The lattice structure 23 illustrated in FIGS. 3A and 3B are equivalent in size (lattice diameter and pitch) over the entire region of the control surface 20 as an assumption; however, the size may be changed depending on a part of the control surface 20 to change mechanical strength. In particular, since the control surface 20 fabricated by the 3D printer is high in design flexibility, the size is easily changeable depending on the part.

Figure 4A:
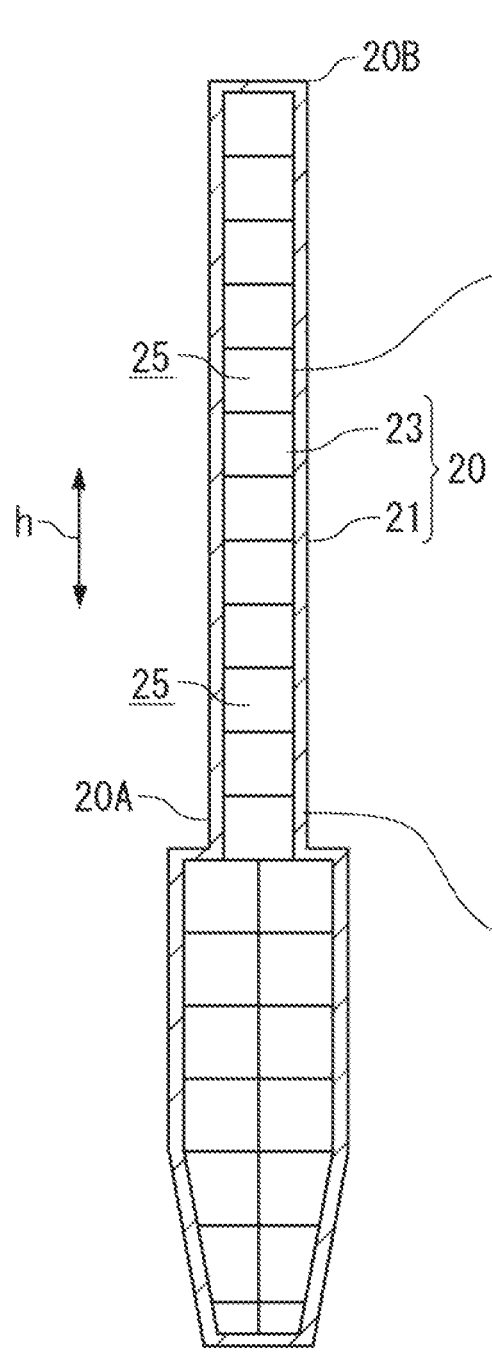
FIGS. 4A to 4C each illustrate a control surface of a flying object according to another embodiment of the present invention, FIG. 4A being a front cross-sectional view, FIG. 4B being a partial enlarged perspective view of FIG. 4A, and FIG. 4C being a partial enlarged perspective view of a part different from a part of FIG. 4B.
Figure 4B:
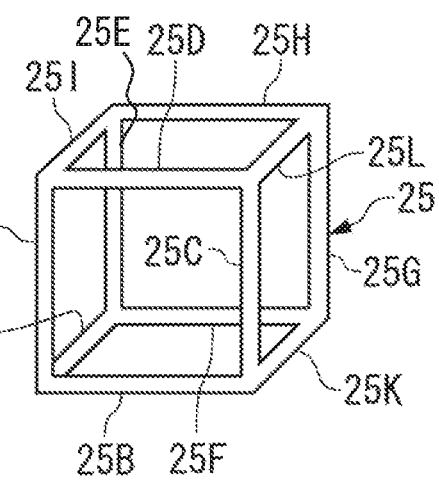
Figure 4C:
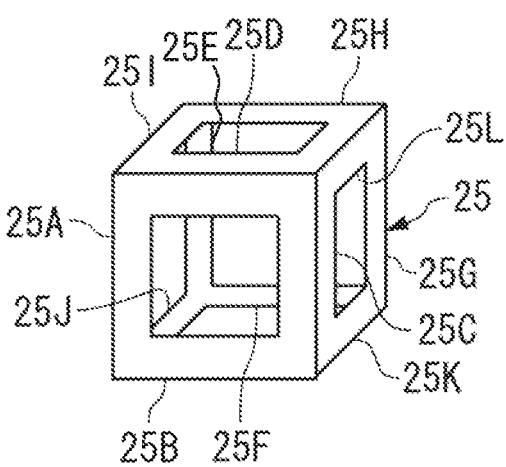

For example, a root 20A that requires the highest bending rigidity in a surface length direction h of the control surface 20 may be increased in lattice diameter or reduced in pitch. FIGS. 4A and 4C each illustrate an example in which the lattice diameter of the root 20A is increased. On the other hand, a part except the root 20A may be reduced in lattice diameter or be increased in pitch relative to the root 20A because the part except the root 20A requires bending rigidity lower than that of the root 20A. In the control surface 20, the occurred bending moment M is reduced as approaching from the root 20A to a front end 20B. Therefore, the lattice diameter may be reduced, or the pitch may be increased from the root 20A toward the front end 20B.

Using the 3D printer facilitates fabrication of such a lattice structure 23. FIGS. 4A to 4C each illustrate the example in which the lattice diameter of the part except the root 20A is made smaller than that of the root 20A.

Figure 5:
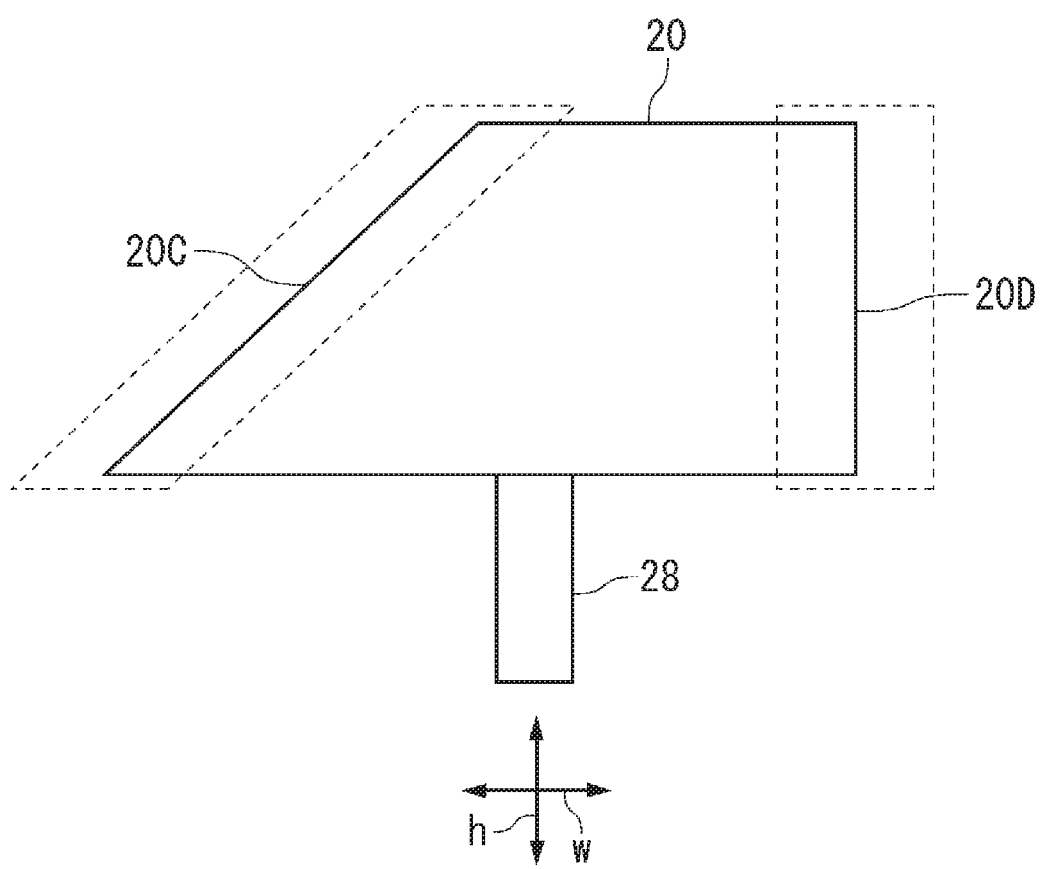
FIG. 5 is a side view of a control surface of a flying object according to still another embodiment of the present invention.
Figure 7A:
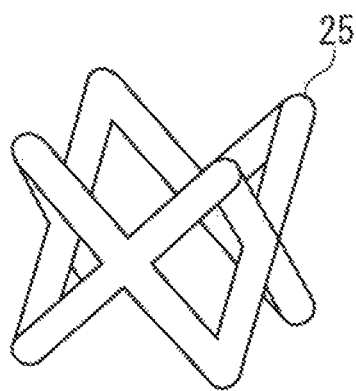
FIGS. 7a-7D are perspective views illustrating structures of various unit lattices each configuring the control surface of the present embodiment.
Figure 7B:
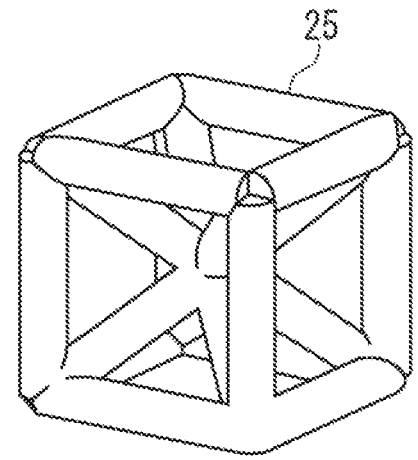
Figure 7C:
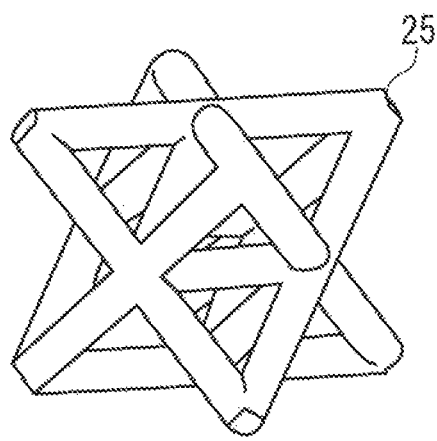
Figure 7D:
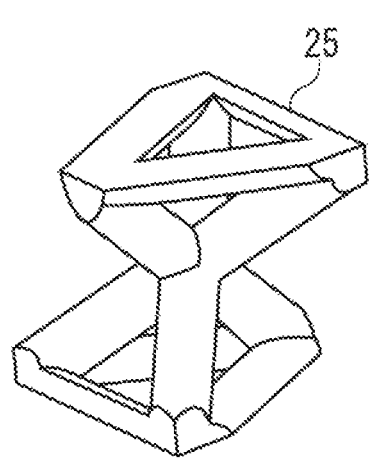

The adjustment of the size of each of the unit lattices 25 in terms of the bending moment M has been described above; however, adjustment of the size of each of the unit lattices 25 in terms of the torsion moment T is also effective. In other words, as illustrated in FIG. 5, a front edge 20C and a rear edge 20D (region surrounded by dashed line) where the torsion moment T is increased, in a surface width direction w of the control surface 20, are preferably increased in lattice diameter or reduced in pitch to exert large torsional rigidity, as compared with a region sandwiched between the front edge 20C and the rear edge 20D of the control surface 20 in the surface width direction w.

Although the preferred embodiment of the present invention has been described hereinbefore, the configurations of the above-described embodiment may be selected or appropriately modified without departing from the scope of the present invention.

For example, in the control surface 20 described above, the example in which the lattice structure 23 is provided over the entire region surrounded by the skin 21 has been described; however, the present invention is not limited thereto.

For example, the bending moment M is small near the front end 20B of the control surface 20. Therefore, a hollow part P not including the unit lattice 25 may be provided near the front end 20B as illustrated in FIG. 6A. The hollow part P, however, is preferably provided at a center part that is separated from the front edge 20C and the rear edge 20D at which the torsion moment T is large, if provided.

In contrast, in the present invention, a solid part may be provided inside the control surface 20. As illustrated in FIG. 6B, in the control surface 20, the root 20A at which the bending moment M is highest may serve as a solid part S, and other regions may serve as the lattice structure 23. This control surface 20 is effective particularly to a case where the bending moment M occurred on the root 20A is large.

As described above, the control surface 20 according to the present invention includes the form in which the entire region covered with the skin 21 is configured of the lattice structure 23, the form in which the region partially includes a hollow part, and the form in which the region partially includes a solid part. A percentage of one or both of the hollow part and the solid part in the control surface 20 should be set based on the bending rigidity and the torsional rigidity required for the control surface 20. To clearly achieve the effects by the lattice structure 23, however, the percentage of the hollow part and the solid part is preferably about 10 wt. % or lower of the control surface 20.

What is claimed is:

1. A flying object, comprising:
   a main body of the flying object; and
   a control surface configured to control an attitude of the flying object, the control surface being mounted on a rear end part of the main body of the flying object,
   the control surface comprising:
   a skin covering an internal space;
   a lattice structure that is provided in the internal space and supports the skin; and
   a control shaft that is attached to the main body of the flying object,
   wherein:
   the main body of the flying object includes an engine that is configured to provide propulsion force to the flying object and an actuator that is configured to rotate the control shaft of the control surface;
   the lattice structure is constituted by a plurality of rectangular parallelepiped unit lattices; and
   a size of the lattice structure varies through variation of one or both of a lattice diameter and a length of each of the plurality of rectangular parallelepiped unit lattices.

2. The flying object according to claim 1, wherein the lattice structure has different bending rigidities in one or both of a surface length direction and a surface width direction.

3. The flying object according to claim 2, wherein:
   a root part of the lattice structure in the surface length direction has a first of the bending rigidities;
   another region of the lattice structure in the surface length direction has a second of the bending rigidities; and
   the first of the bending rigidities is larger than the second of the bending rigidities.

4. The flying object according to claim 2, wherein:
   a front edge of the lattice structure and a rear edge of the lattice structure in the surface width direction have a first of the bending rigidities;
   another region of the lattice structure in the surface width direction has a second of the bending rigidities; and
   the first of the bending rigidities is larger than the second of the bending rigidities.

5. The flying object according to claim 1, wherein the lattice structure partially includes a hollow part.

6. The flying object according to claim 1, wherein the lattice structure partially includes a solid part.

7. The flying object according to claim 1, wherein the control surface is one of a plurality of control surfaces mounted on the rear end part of the main body of the flying object.

8. The flying object according to claim 1, wherein the skin forms an outer cover covering the internal space of the control surface.

9. The flying object according to claim 1, wherein:
   the skin forms an outer cover covering the internal space of the control surface; and
   the skin is formed integrally with the lattice structure.

10. The flying object according to claim 9, wherein the skin and the lattice structure contain a ferrous metal material or a nonferrous metal material.

11. The flying object according to claim 9, wherein the skin and the lattice structure are laser sintered.

12. The flying object according to claim 1, wherein the lattice structure is three-dimensionally (3D) printed.

13. The flying object according to claim 1, wherein the lattice structure has different torsional rigidities in one or both of a surface length direction and a surface width direction.

14. The flying object according to claim 13, wherein:
   a root part of the lattice structure in the surface length direction has a first of the torsional rigidities;
   another region of the lattice structure in the surface length direction has a second of the torsional rigidities; and
   the first of the torsional rigidities is larger than the second of the torsional rigidities.

15. The flying object according to claim 13, wherein:
   a front edge of the lattice structure and a rear edge of the lattice structure in the surface width direction have a first of the torsional rigidities;
   another region of the lattice structure in the surface width direction has a second of the torsional rigidities; and
   the first of the torsional rigidities is larger than the second of the torsional rigidities.

* * * * *